United States Patent
Ellis et al.

(10) Patent No.: US 12,155,905 B2
(45) Date of Patent: Nov. 26, 2024

(54) INTERACTIVE ELECTRONIC LIBRETTO/TRANSLATION HD DISPLAY INTERFACE APPARATUS AND METHOD

(71) Applicant: The Santa Fe Opera, Santa Fe, NM (US)

(72) Inventors: Gary Ellis, Santa Fe, NM (US); Karl G. Kern, Santa Fe, NM (US); Paul Horpedahl, Santa Fe, NM (US); Adelaide Zhang, Santa Fe, NM (US)

(73) Assignee: The Santa Fe Opera, Santa Fe, NM (US)

( * ) Notice: Subject to any disclaimer, the term of this patent is extended or adjusted under 35 U.S.C. 154(b) by 0 days.

(21) Appl. No.: 17/608,658

(22) PCT Filed: May 4, 2020

(86) PCT No.: PCT/US2020/031374
§ 371 (c)(1),
(2) Date: Nov. 3, 2021

(87) PCT Pub. No.: WO2020/227243
PCT Pub. Date: Nov. 12, 2020

(65) Prior Publication Data
US 2022/0150597 A1 May 12, 2022

Related U.S. Application Data

(60) Provisional application No. 62/843,185, filed on May 3, 2019.

(51) Int. Cl.
H04N 21/485 (2011.01)
H04N 21/214 (2011.01)
(Continued)

(52) U.S. Cl.
CPC ..... *H04N 21/4856* (2013.01); *H04N 21/2143* (2013.01); *H04N 21/414* (2013.01); *H04N 21/6118* (2013.01)

(58) Field of Classification Search
CPC .......... H04N 21/4856; H04N 21/2143; H04N 21/414; H04N 21/6118
See application file for complete search history.

(56) References Cited

U.S. PATENT DOCUMENTS 5,739,869 A    4/1998 Markle et al.
6,154,720 A    11/2000 Onishi et al.
(Continued)

FOREIGN PATENT DOCUMENTS

WO    9507122 A1    3/1995
WO    0169943 A1    9/2001

OTHER PUBLICATIONS

Sleeper, Morgan T., "Musicolinguistics: New Methodologies for Integrating Musical and Linguistic Data", Dissertation UC Santa Barbara. Jun. 2018 https://escholarship.org/uc/item/59p43d.

*Primary Examiner* — Kyu Chae
(74) *Attorney, Agent, or Firm* — PEACOCK LAW P.C.; Deborah A. Peacock; Justin R. Jackson

(57) ABSTRACT

An addressable apparatus and method for simultaneous presentation of a performance script or other commentary, dialogue, and/or visual information available in the original language or one or more translations which can be selected by the user. Other visual information such as, sponsors, advertisements, and emergency alerts can be transmitted to each display in full color graphics or video. In one embodiment, a touch screen interface can allow point of sale applications pre-show, during intermissions, and/or post-
(Continued)

show. Individual addressability allows direct messaging capabilities, seat-naming, anti direct-marketing media opportunities.

16 Claims, 15 Drawing Sheets

(51) Int. Cl.
*H04N 21/414* (2011.01)
*H04N 21/61* (2011.01)

(56) References Cited

U.S. PATENT DOCUMENTS

| | | | |
|---|---|---|---|
| 6,611,537 B1 * | 8/2003 | Edens | H04N 21/4363 |
| | | | 375/E7.274 |
| 6,760,010 B1 | 7/2004 | Webb | |
| 7,019,723 B2 | 3/2006 | Tsuji | |
| 7,046,137 B2 | 5/2006 | Palmquist | |
| 7,138,991 B2 | 11/2006 | Tsuji | |
| 7,167,210 B2 | 1/2007 | Seo et al. | |
| 7,415,662 B2 | 8/2008 | Rothmuller et al. | |
| 7,603,321 B2 | 10/2009 | Gurvey | |
| 7,760,668 B1 * | 7/2010 | Zinjuvadia | H04L 45/48 |
| | | | 370/256 |
| 7,869,988 B2 | 1/2011 | Wood et al. | |
| 8,463,848 B2 | 6/2013 | Kaplan et al. | |
| 8,566,077 B2 | 10/2013 | Ander et al. | |
| 9,300,505 B2 | 3/2016 | Kaplan et al. | |
| 9,445,134 B2 | 9/2016 | De Lissandri | |
| 10,291,420 B2 | 5/2019 | Mantin | |
| 2002/0118144 A1 | 8/2002 | Edmonds | |
| 2005/0052375 A1 | 3/2005 | Devos et al. | |
| 2008/0184087 A1 * | 7/2008 | Hayashi | H04L 1/1825 |
| | | | 714/751 |
| 2009/0049469 A1 * | 2/2009 | Small | H04L 12/66 |
| | | | 725/35 |
| 2009/0249420 A1 * | 10/2009 | Kim | H04N 21/84 |
| | | | 725/115 |
| 2010/0199183 A1 | 8/2010 | Wang et al. | |
| 2010/0225654 A1 | 9/2010 | Theis | |
| 2010/0238316 A1 * | 9/2010 | Kim | H04N 9/735 |
| | | | 382/165 |
| 2014/0244235 A1 * | 8/2014 | Michaelis | H04L 12/1827 |
| | | | 704/2 |
| 2015/0195845 A1 | 6/2015 | Wang et al. | |
| 2015/0363899 A1 * | 12/2015 | Krause | G06Q 50/184 |
| | | | 705/26.3 |
| 2016/0302257 A1 | 10/2016 | Roethig et al. | |
| 2016/0344683 A1 * | 11/2016 | Park | H04L 61/2007 |
| 2017/0064371 A1 * | 3/2017 | Kitazato | H04N 21/236 |
| 2018/0131741 A1 * | 5/2018 | Song | H04N 21/8193 |
| 2019/0097754 A1 * | 3/2019 | Yu | H04L 29/04 |
| 2019/0273965 A1 * | 9/2019 | Shurgot | H04N 21/4147 |

* cited by examiner

Libretto Database File

| Libretto Settings |
|---|
| ShownName |
| FadeInDefault |
| FadeOutDefault |
| LanguageFade |
| LanguageDisplay |
| MiscFade |
| Typeface |
| TypeSize |
| LineSpacing |
| TypeColor |
| TextJusticiation |
| Backlight |

| Cues |
|---|
| CueID |
| CueNumber |
| Language1 |
| Language2 |
| FadeInTime |
| FadeOutTime |
| Flag |

| Bookmarks |
|---|
| BookmarkID |
| LinkedCue |
| Description |

| Banners |
|---|
| BannerID |
| BannerNumber |
| Language1 |
| Language2 |
| FadeInTime |
| FadeOutTime |
| Flag |

FIG. 1C

Libretto Cues:

| 00 | 01 | 02 | 03 | 04 | 05 | 06 |
|----|----|----|----|----|----|----|

Signifier  Cue Number  Language 1  Language 2  Fade In  Fade Out  Flag

INTERACTIVE ELECTRONIC LIBRETTO/TRANSLATION HD DISPLAY INTERFACE APPARATUS AND METHOD

CROSS-REFERENCE TO RELATED APPLICATIONS

This application claims priority to and the benefit of the filing of U.S. Provisional Patent Application No. 62/843,185, entitled "Interactive Electronic Libretto/Translation HD Display Interface Apparatus and Method", filed on May 3, 2019, and the specification thereof is incorporated herein by reference.

BACKGROUND OF THE INVENTION

Embodiments of the present invention relate to a communication system, and more particularly to a communication apparatus and method for simultaneous broadcasting of visual information during performances, which can include live performances, lectures, cinema, and other places of gathering whereby multiple language translations can optionally be selected by the user.

The current state of the art for displaying translations of a performance, either live (as in theatre or opera), or recorded (as in cinema or television mediums), is by displaying a single libretto or script upon a surface within the field of vision of the audience. The "super-titles" used in opera are usually in the language commonly spoken at the site of the performance. Translations in film and television are accomplished using "subtitles" which are superimposed over the presented image, different copies being made for specific languages.

The main problem with the current state of the art, and specifically these systems, is that the entire audience is forced to see the translation whether they want to or not. Only one translation at a time is feasible and the displayed information can become very large and too complicated to comprehend with the needed rapidity. Many opera patrons are offended by super-titles, whereas many other opera patrons find supertitles essential to their understanding and enjoyments of the performance.

It is therefore desirable to provide patrons with an individual display unit which can present several language channels of information, but does not obstruct or disturb patrons who do not wish to see the displayed information or other visual depictions of the performance.

Known inventions have attempted to address multi-channels and languages, as well as display units accessible at individual seats. However, there are significant limitations of the known methods and systems. These limitations include a mono-chromatic and low-resolution display. Size, color, and format of text is also fixed and limited, Diacritics and glyphs, which are particular to many languages, cannot be visually represented. Still further the user interfaces are limited to channel selection via a momentary circuit button, thus making it difficult or impractical for use in systems that provide a user with numerous channels to select from.

Such known systems are also not robust in that they rely on a clean operating frequency—where there are no other sources operating on a similar frequency that could interfere within the broadcast frequency. However, because the recent sales of FCC frequencies to communications providers the amount of "reliable" open transmission spectrum has significantly been reduced.

While the ability to provide information display using multiplexed data that is transmitted over wires is known, such systems use addresses to decode transmitted data. However, because embodiments of the present invention will often be used on a large scale, the scale of the entire system can result in a delay caused by the decoding of multiplexed data, which results in staggered arrival of the messages to the end user. This is problematic for live performances because the delay of the data will be noticeable in such live performances.

Some known tele-text method of displaying text on television using control characters rely on a keyboard to access information and cannot support live performance use. Further, other known wireless transmitters lack the ability to be used for live performances—particularly where the ability to transmit and display simultaneously on multiple channels is required.

There is thus a present need for an invention that incorporates both wired and wireless communication platforms for the most reliable delivery of language translations in the given environment.

BRIEF SUMMARY OF EMBODIMENTS OF THE PRESENT INVENTION

Embodiments of the present invention relate to a multi-channel data distribution method that includes forming at least one data packet by combining data for a plurality of channels, a signifier, and at least one display instruction packed together in a single data packet; and transmitting the at least one data packet from an arbiter to a plurality of displays. Optionally, transmitting the at least one data packet from an arbiter to a plurality of displays can include sending the at least one data packet from the arbiter to one or more distribution servers which then send the at least one data packet to the plurality of displays. The method can include loading preselected display data into memory on the plurality of displays. Loading preselected display data into memory on the plurality of displays can include sending the preselected display data from the arbiter. Optionally, the plurality of displays can display a non-monochromatic image that was loaded as preselected display data into the plurality of displays. Optionally, loading preselected display data into memory on the plurality of displays can include loading a preselected video for display into memory of the plurality of displays. The method can further include the plurality of displays displaying the video that was loaded as preselected display data.

In one embodiment, combining data for a plurality of channels can include combining libretto data from at least two different languages. The method can include loading each of the two different languages into a separate channel in the data packet. Transmitting the at least one data packet can further include transmitting the at least one data packet on a bi-directional communication channel. The multi-channel data distribution method of claim 9 further comprising determining whether all connected displays have received the at least one data packet and if at least one display is determined not to have received the at least one data packet, retransmitting the at least one data packet on a line that is different from a line that the at least one data packet was originally transmitted on. Optionally, determining whether all connected displays have received the at least one data packet can include retransmitting the at least one data packet from a distribution network switch that is programmed for rapid spanning tree that can self-check data sent and received.

The method can also include determining whether all connected displays have received the at least one data packet and if at least one display is determined not to have received the at least one data packet, retransmitting the at least one data packet on a line that is different from a line that the at least one data packet was originally transmitted on and transmitting subsequent data packets on both a first line and a second line. The method can include monitoring a return line with a network switch to confirm that a signal sent on a transmit line is returned on the return line. Optionally, transmitting the at least one data packet can include transmitting the at least one data packet from an arbiter to a plurality of individually addressable displays. Transmitting the at least one data packet from an arbiter to a plurality of individually addressable displays can include providing information in the at least one data packet directed to and received by some subset of the plurality of displays. Optionally, transmitting the at least one data packet from an arbiter to a plurality of individually addressable displays can include providing sponsor information that is unique to at least some subset of the plurality of displays. In the method, transmitting the at least one data packet can include transmitting the at least one data packet from an arbiter to a plurality of displays via a closed-loop daisy-chained network, transmitting the at least one data packet via a closed-loop daisy-chained network which is formed on a closed loop of two 10/100 twisted pairs on a network cable, and/or transmitting the at least one data packet to a plurality of groups of displays. Optionally, forming at least one data packet can include forming at least one data packet comprising data derived from a live entertainment event that is occurring in real-time.

Embodiments of the present invention also relate to a multi-channel data display apparatus that includes an arbiter; at least one distribution server; and a plurality of individually addressable non-monochromatic color displays connected to the at least one distribution server via a daisy-chain configuration. The individually addressable non-monochromatic color displays can be arranged in a plurality of groups having members that are connected, as a daisy chained network, together with at least one of said at least one distribution servers. The daisy chained network can include a closed loop of two 10/100 twisted pairs on a network cable. The individually addressable non-monochromatic color displays can each include a touchscreen. The addressable non-monochromatic color displays can be configured to provide channel selection to a user through the touchscreen and not via a momentary mechanical switch.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings:

FIG. 1C is drawing which illustrates information that can be stored in a libretto database file according to an embodiment of the present invention;

DETAILED DESCRIPTION OF THE INVENTION

Figure 1A:
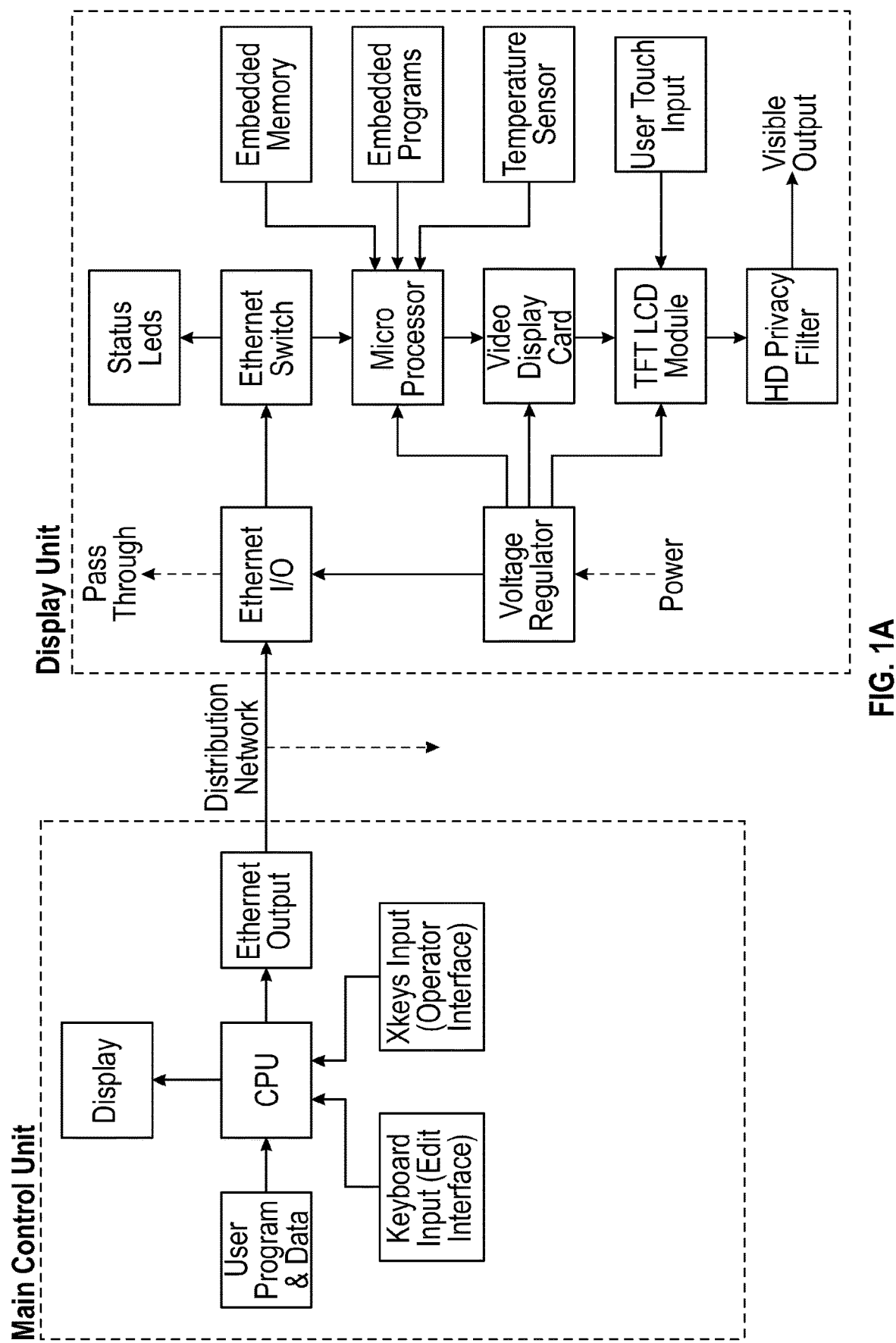
FIG. 1A is a schematic representation of an overall delivery system according to an embodiment of the present invention.
Figure 1B:
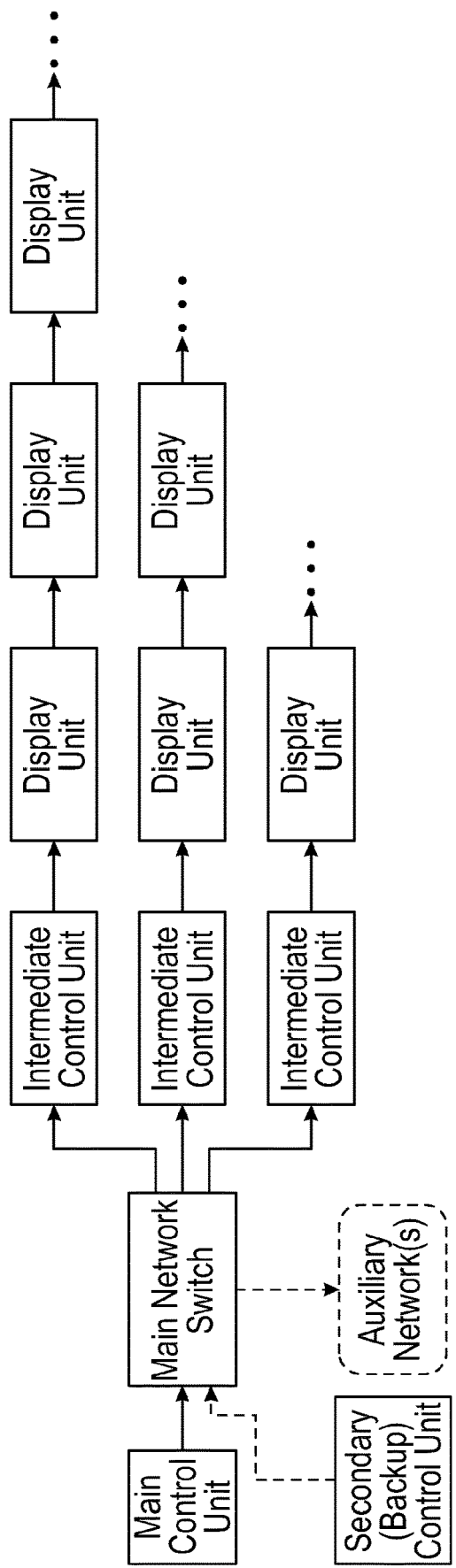
FIG. 1B is a schematic representation of an overall network distribution system according to an embodiment of the present invention.

An embodiment of the present invention relates to an apparatus and method for simultaneously providing individual users, most preferably at a plurality of individual locations, the ability to select a visual text in various languages for performances, including but not limited to operas, theatre, movies, lectures, worship, plays, sporting events, etc., which can include a translation of a performance or event. In one embodiment, the invention comprises a multi-channel apparatus for the storing, transmitting, and simultaneous display of at least one selected channel to a remote site. In one embodiment, the term "channel" means a predetermined selection of available content—for example, in one embodiment, a first channel can comprise a series of English text while a second channel can comprise a series of Spanish text. In one embodiment, each language of libretto can be given its own channel, therefore any typed or scripted language can be broadcast as a channel with no limitation on the number of simultaneous transmissions (for example, English, Spanish, French, Italian, and/or any other language). In one embodiment, the information and/or data is transmitted to the display units, and upon command, each display unit displays the selected channel of information simultaneously with other display units. For example, in one embodiment, at a predetermined time, users who have selected an English channel can receive a particular statement in English at the same time that users who have selected a Spanish channel can receive the same statement in Spanish.

A preselected sequence of text that comprises at least one channel of data, and its encoding and decoding information is occasionally referred to as a "cue". In one embodiment, the distribution of data packets is preferably accomplished via a main control unit or "arbiter" which is preferably used to time and transmit each title or "cue" of data to distribution servers that then broadcast the title or cue of data to the display interfaces.

Each data packet preferably comprises at least a predetermined portion of the preselected sequence of text, which can include for example the text of a spoken phrase, sentence or statement of an opera, and a display cue from the main control unit. At least one display interface is preferably provided for receiving the data packets. A buffer is also preferably provided for storing data from each of the data packets. An apparatus for selecting at least one channel is also preferably provided on or in conjunction with each display interface.

The data can optionally comprise one or more of a preselected sequence of text, monochromatic, grayscale, and/or full color graphics, a digital score, images, video and/or animation. In one embodiment, the data can also optionally include individually addressed sponsor, seat naming, and/or one or more advertisements. Any data can optionally be distributed to individual units prior to its actual display and stored for recall in order to eliminate the delay in transmission for larger portions of data, which can include for example images and/or video. In this case, the main control software can transmit the desired file(s) to a single unit, a selection of units, or every unit. The relevant files can then be saved within a predetermined file storage location on each receiving unit and can be later displayed on-screen upon receipt of a command as sent by the main control software. A command of this kind can, for example, contain a signifier and a file name, with the signifier indicating to the unit an instruction to display any media with a corresponding name that can be found in the predetermined location. In the case where no matching file exists, the display can fall back to a default image, or simply do nothing.

The transmitted data package can optionally be sent by way of a transmission control protocol or a user datagram protocol standard, therefore making use of the services provided therein, such as header inclusion and data integrity verification checks. When using a transmission mechanism that provides data verification, upon receipt the next data packet the display unit will preferably verify that the data package is correctly received, and if so, override the stored data in a buffer. Otherwise, the display preferably ignores that received transmission and waits for the next transmission, whereupon the process is repeated. This ensures that the data received, processed, and displayed is identical to the data transmitted from the main control unit. In the event of an incomplete or corrupted transmission receipt, the display preferably waits for another transmission. The data packets can be broadcast continuously or periodically, including at predetermined intervals, by the main control unit and transmitter. The data packets can also comprise one or more predetermined messages to control display brightness, text size, and/or data display time. The main control unit preferably comprises an apparatus for selecting the at least one predetermined portion of the preselected sequence of text. In one embodiment, this selection and transmission can be handled by a skilled operator initiating an input—for example pressing a "go" button. While in other instances this selection can occur with a pre-programmed timing sequence, or remote trigger interface receiving a command, which can optionally be received from other low voltage interfaces such as, lighting control systems, midi commands, logic triggers, combinations thereof, and the like.

The apparatus for distributing can include a primary distribution line and at least one secondary branch. This secondary branch preferably allows for a secondary transmission device to provide back-up system redundancy in the event the primary "arbiter" fails during performance. The structure for distributing preferably comprises an apparatus for electrically isolating a signal between the primary distribution line and the at least one secondary branch.

In one embodiment, the invention can simultaneously display at a remote site at least one channel of a preselected stored sequence of multichannel text—most preferably including: storing the preselected sequence of multichannel text in a main control unit, and converting at least one predetermined portion of the preselected sequence of multichannel text into data packets; placing a display cue into each of the data packets; transmitting the data packets to at least one display apparatus, storing the converted at least one predetermined portion of the preselected sequence of multichannel text, and transmitting a display cue from the main control unit to the at least one display apparatus; and selecting the at least one channel and displaying the at least one predetermined portion of the preselected sequence of text of the selected at least one channel.

In one embodiment, the present invention utilizes the Unicode standard of encoding characters, giving access to all character sets for all written languages.

The apparatus for distributing data preferably comprises at least one transmitter and at least one receiver. The data is preferably transmitted by electromagnetic radiation and/or a closed loop network for portable and/or hard-wired applications.

Embodiments of the present invention preferably provide the use of a high-resolution interface, which is most preferably a touchscreen interface, that allows for clearer text display and full color graphics, video, and/or animation. Embodiments of the present invention preferably provide one or more of:

1) A display unit that presents a channel of information to view, describing a performance, lecture, or script to audience members either individually or to a group;

2) A scalable system that can be partially or completely installed or expanded at any time—particularly a system where installation work can cause minimal disturbance to the building and environment;

3) The capacity to present any written language at any time;

4) A system wherein people with disabilities can have access to visual and/or audio information;

5) A system that can be used in outdoor locations—for example at outdoor concerts and performances, multi-cultural events, stadium events, sporting events, religious services, combinations thereof and the like;

6) A portable system for use in touring productions whereby an apparatus constructed according to an embodiment of the present invention can be set up quickly and easily in different locations and be assured that the system is available for use for that production;

7) A scalable system that can be partially installed and made operational and then, at a future date, can be expanded as needs require or funding becomes available—in this way, immediate compliance with disabled person's legislation is possible;

8) Wide-ranging transmission medium, thus making it possible to transmit to a large area, comprising multiple buildings or large geographic zones;

9) No limit to the number of units that can simultaneously operate, although additional distribution servers and transmitters may be required to cover the necessary area depending on the space and transmission medium used;

10) Units that can optionally be powered by battery, thus providing the ability for them to operate independently and not need a power distribution system to be installed at the point of use;

11) A system that receives its data by electromagnetic radiation, thus permitting it to operate independently and not require cables to be installed at the point of use;

12) A system that utilizes the UNICODE character set, thus permitting every unit the ability to display any written language—multiple variations of the unit are not required for different countries and all languages are available on every display, if desired, for a particular application;

13) The ability to allow individual users a choice in the information they wish to see in conjunction with a performance;

14) Each individual member of an audience can be provided with the ability to choose one of many channels of information of a performance;

15) The ability to have a single master copy of the all translations desired encoded therein, which is particularly useful for cinema because it can be duplicated and sent to any venue where, with the appropriate equipment, any of the included translations can be accessed by individual patrons;

16) The ability to implement and/or provide other written graphic information, such as symbolic representation of sign language for persons with hearing disabilities;

17) Complex formatting of the displayed text is achieved by special formatting codes that allow text to be positioned anywhere on the screen while still retaining the text information in compact character code form this has the advantage of containing the data in very a compact form, thus reducing the amount of data that needs to be transmitted if a graphic bitmapped scheme were otherwise employed; and/or 18) The ability to restrict the visual output of a display so that it is clearly visible only to that specific individual user.

In one embodiment, the display, which can include for example a libretto display apparatus, can include hardware components and associated software to provide a user with the ability to view a selected score, or for example text of an opera, on an individual and/or group display unit, most preferably in a language selected by the user. Embodiments of the present invention are particularly useful in live theatre, live opera, cinema, television, movies, sporting events, and other performances and media—particularly those where a plurality of people are viewing and/or listening to a common event.

Referring now to the drawings, an embodiment of the present invention is schematically illustrated in FIG. 1A. Further to FIG. 1A, a Wi-Fi chip or other wireless communications chips and/or circuits can be provided to enable wireless distribution. One or more displays preferably use this number to determine what to do with the information contained in the rest of the packet.

Figure 2A:
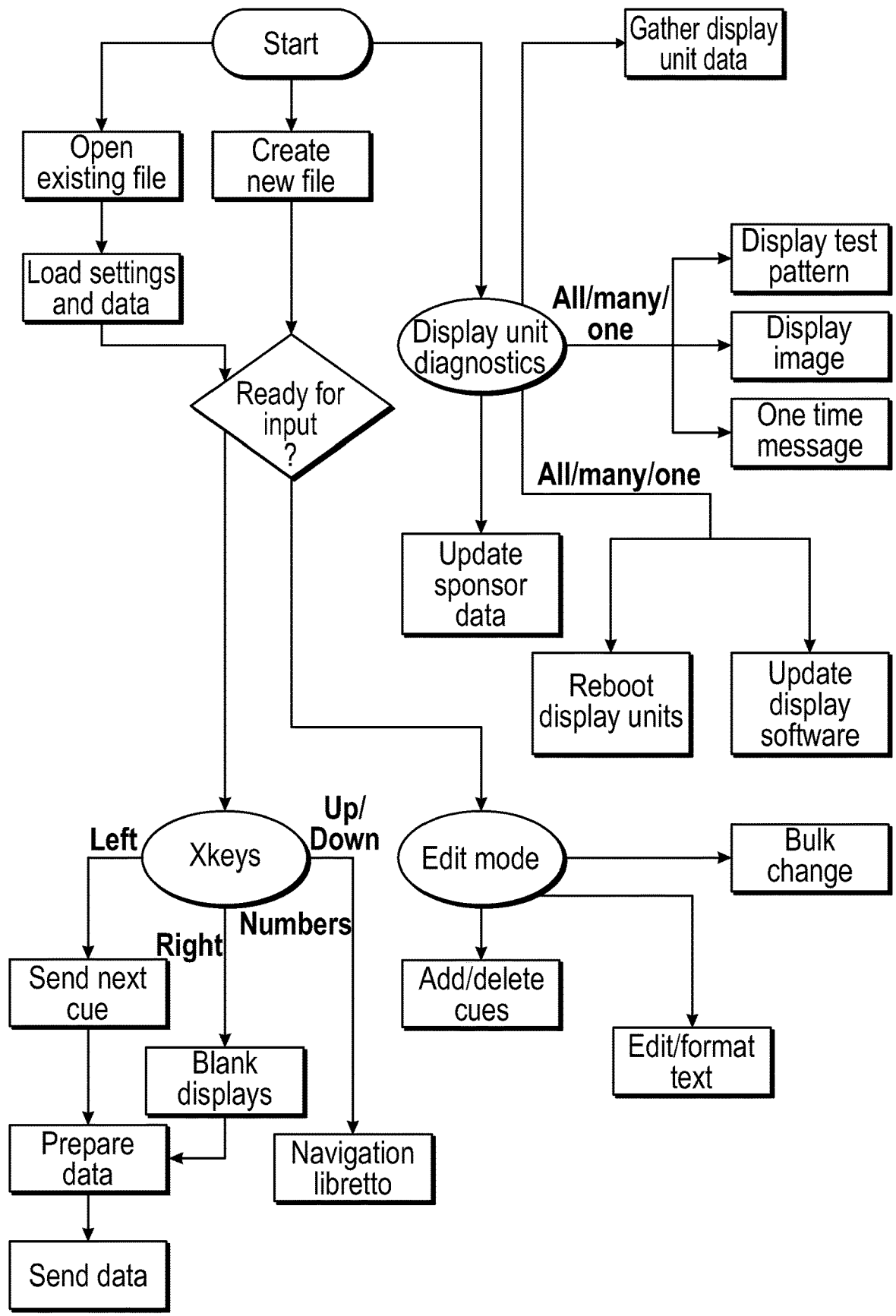
FIG. 2A is a flow chart which illustrates control logic for an example of a performance mode of an arbiter for transmission of data into a data packet according to an embodiment of the present invention.
Figure 2B:
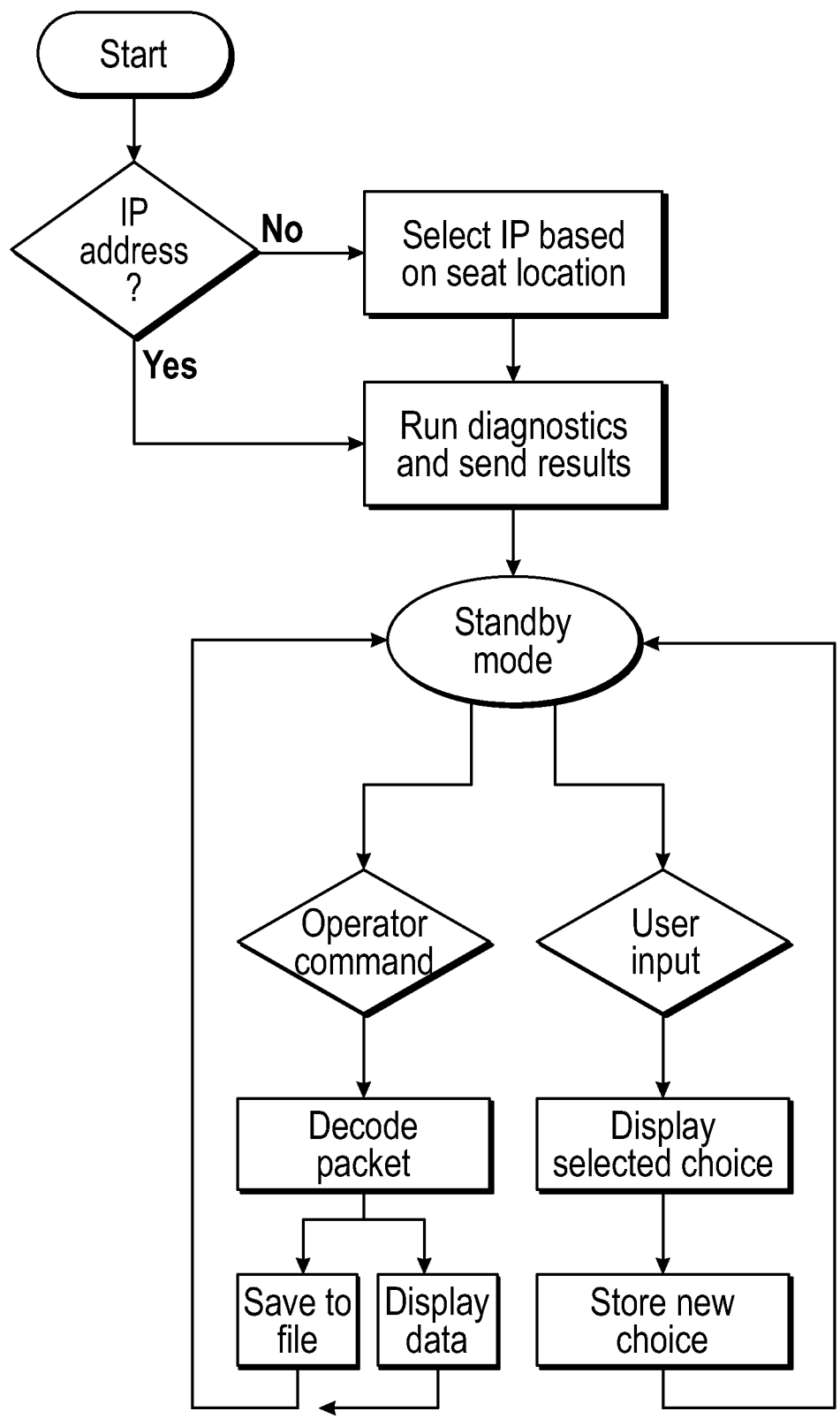
FIG. 2B is a flow chart which illustrates the general procedure taken by a display unit after bootup which can include receiving of data from a data packet according to an embodiment of the present invention.
Figures 2C, 2D:
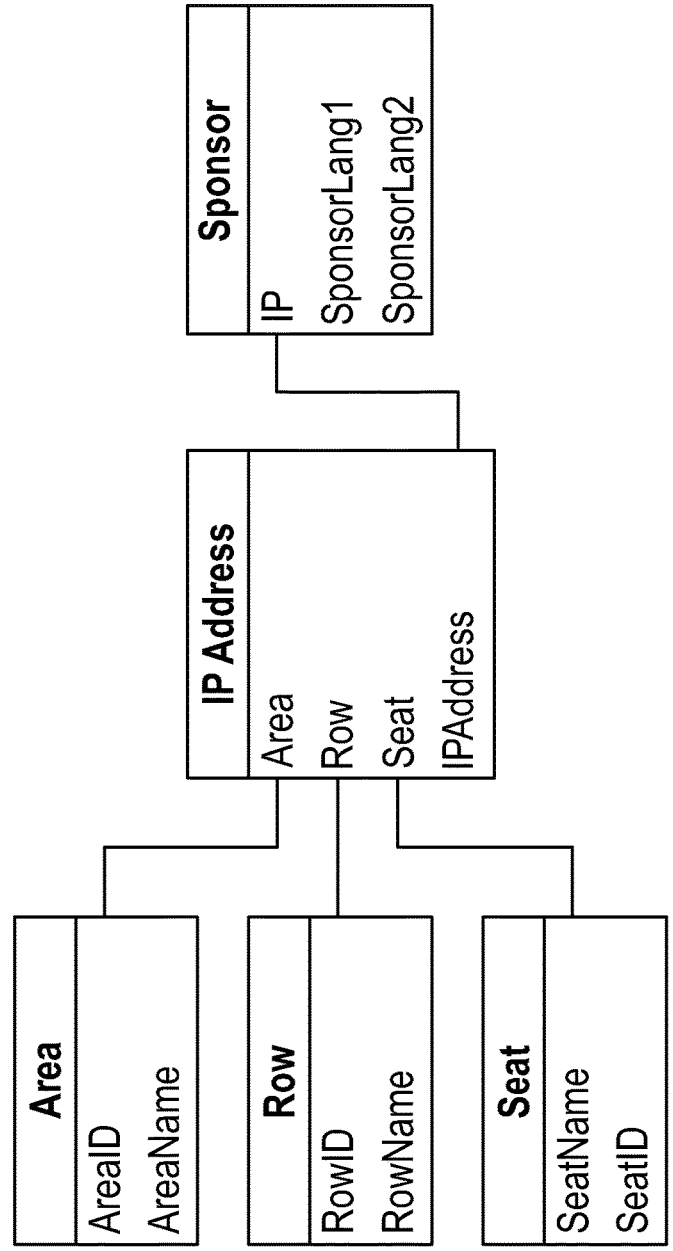
FIG. 2C is a drawing which illustrates an example of possible encoding of data in a data packet according to an embodiment of the present invention.
FIG. 2D is a drawing which illustrates an example of data that can be stored in a sponsor database file according to an embodiment of the present invention.

As best illustrated in FIG. 2C, each packet sent from the arbiter preferably includes a "signifier" number at the beginning of the cue packet. The signifier in the examples of this application will always be represented by the position 00. Packets can be divided with the pipe or bar symbol ("|"). In FIG. 2C, each division is labeled using a number from 00-06. To be clear, these numbers (00-06) are used merely for illustrative purposes and do not imply that each packet contains data that is organized based on two adjacent binary digits. Rather, each of numbers 00-06 can represent any desired number of digits, and/or bytes as may be desired for a particular application or embodiment.

Any cues containing, for example, libretto text can have the above format. The cue number (position 01) is equivalent to the number of the cue, or all digits in the format "xx.xx".

The fade in time (position 04) is preferably a number representing the amount of time, which can be represented as a number of milliseconds, that that it will take for this particular cue to fade in from a blank screen. In one embodiment, if this field is left empty, the default fade in time is preferably used instead.

The fade out time (position 05) is a number representing the amount of time, which can be represented a number of milliseconds, that it will take for this particular cue to fade out to a blank screen. In one embodiment, if this field is left empty, a default fade out time is preferably used instead. Optionally, a display instruction can include a fade in time and/or a fade out time.

In one embodiment, the language 1 and language 2 (positions 02 and 03) preferably hold translated text in desired languages. Any formatting of the text (italicization, boldface, etc.) is preferably embedded there in HTML format. Any desired language can be used, and optionally slots for additional languages can be added.

The flag marker (position 6) is preferably a Boolean value that the operator can optionally use to mark certain cues for editing. For example, a specific formatting change can be made to all cues with an active flag. Alternatively, flags can be used to indicate those cues which have recently modified text and require additional attention from a translator.

Display Cues:

In some cases, a packet can contain only a signifier (i.e. only a single number is sent). For example, a predetermined pattern can indicate to the display unit a command to fade out to black, regardless of what is currently displayed on the screen. It can take a default fade time. Another example of a predetermined pattern is one that can be used to instruct the display unit to display a logo or other image stored in memory.

Libretto Setting Cues:

| | |
|---|---|
| 00 | Signifier |
| 01 | Name of show |
| 02 | Fade in time (ms) default |
| 03 | Fade out time (ms) default |
| 04 | Fade time for language changed text (ms) |
| 05 | Display time for language changed text (ms) |
| 06 | Misc. fade time |

| | |
|---|---|
| 07 | Display typeface |
| 08 | Typeface size |
| 09 | Line spacing |
| 10 | Typeface color |
| 11 | Text justification default |
| 12 | Display brightness (%) |

In one embodiment, cues containing information about libretto-wide settings can have the above format. Libretto setting cues can be sent when a new libretto has been opened for performance by the arbiter program. Libretto setting information can be stored alongside the text of the libretto itself and is therefore specific to a particular show. Display units can save the information received here for use throughout the rest of the libretto, unless the settings are changed and/or reset manually.

The default fade times (positions 02 and 03) can determine the amount of time any cue affecting the display will take to execute if no other fade time parameter is given. The typeface (position 07) preferably determines which embedded font will be used to display all text within the libretto. The typeface size, color, line spacing, and text justification (positions 08, 09, 10, 11) can be modified to best fit the typeface selected. Any chosen language(s) preferably use this typeface.

As best illustrated in FIG. 2D, in order for each display unit to be individually addressable and easily identified, each unit is preferably assigned an Internet protocol ("IP") address, or other unique identifier, based on its location (area, row, and seat),. These addresses allow, for example, unique sponsor data to be attached to each unit.

Sponsor data is preferably contained in a master database that can be edited via the inOvation software on the arbiter. When an update is made, the user can update the display units by distributing the new database, and from there each unit will look for an entry that matches its own IP address or other unique identifier. If no match is found, the unit will preferably default to a predetermined text.

Figure 3A:
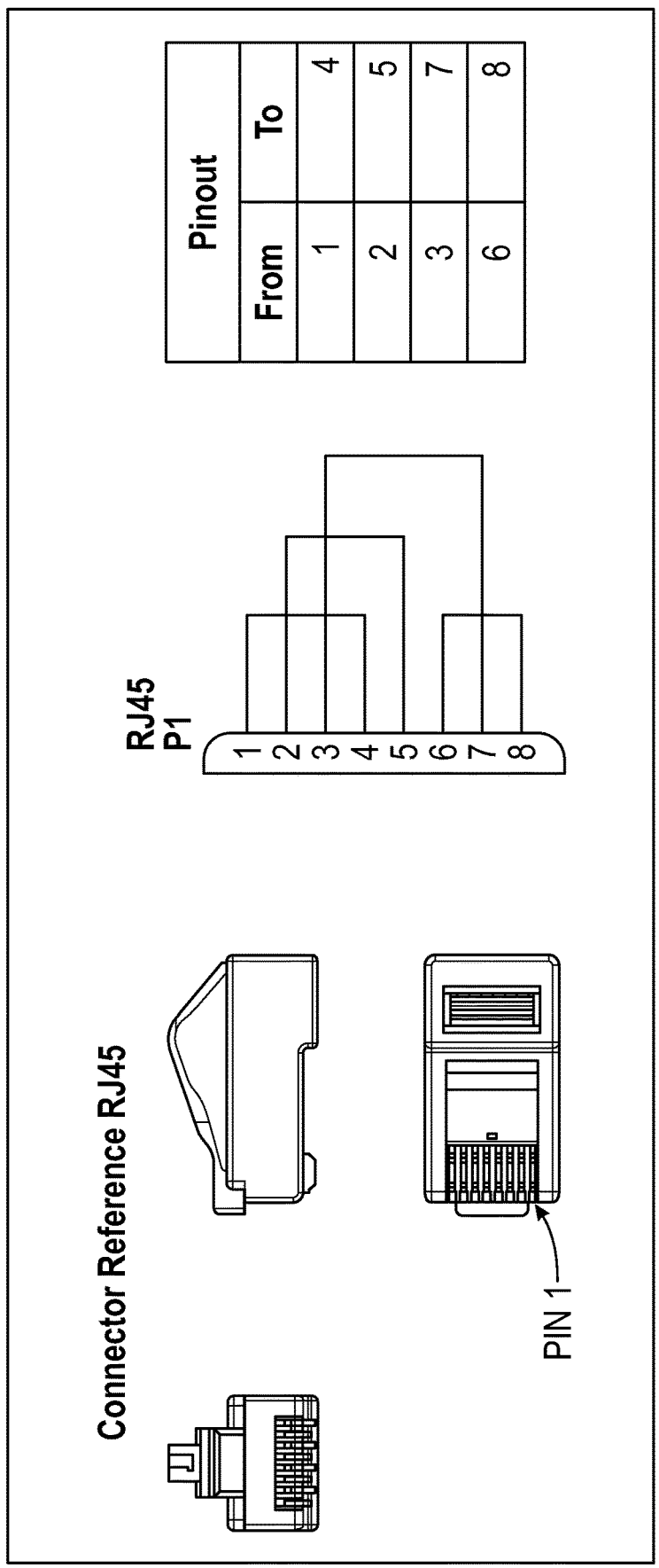
FIG. 3A is a drawing which illustrates an embodiment of a loopback plug, along with its wiring diagram/pinout that can be used at the end of a redundant ring according to an embodiment of the present invention.
Figure 3B:
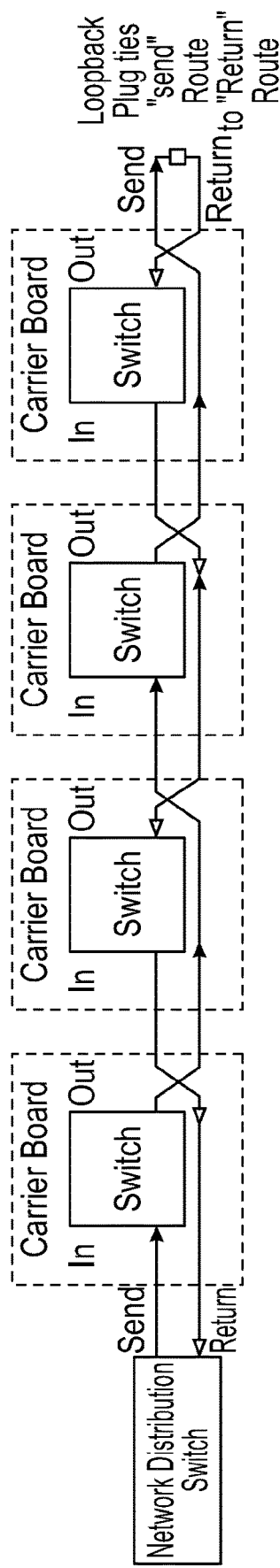
FIG. 3B is a drawing which illustrates a redundant ring and closed loop network wiring according to an embodiment of the present invention.
Figure 4A:
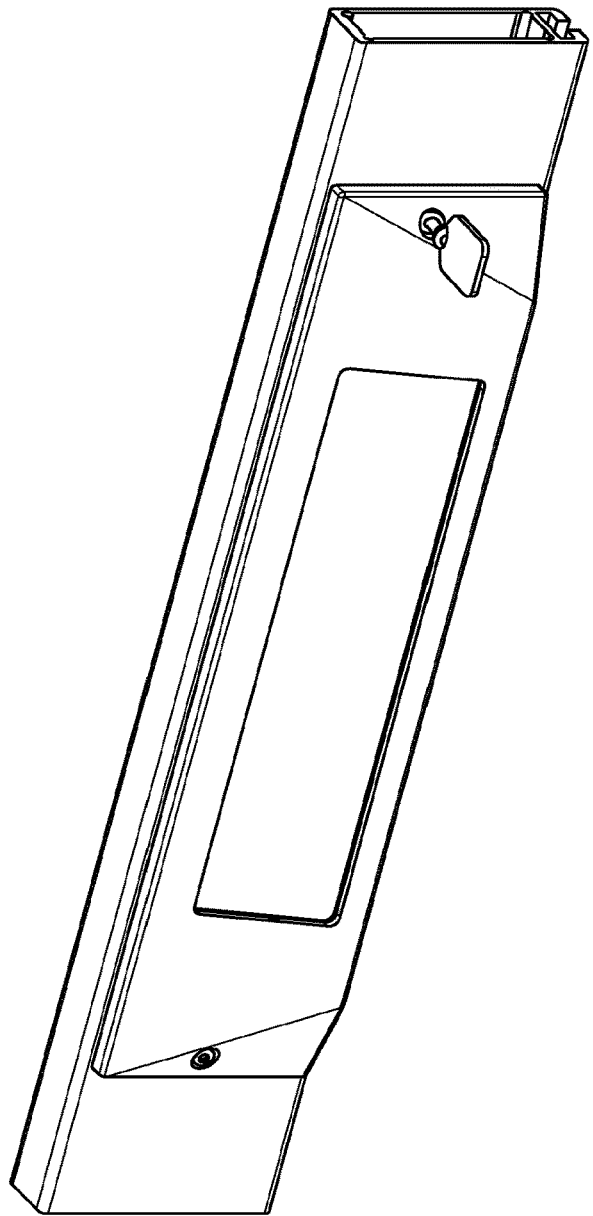
FIG. 4A is a drawing which illustrates an elevated front perspective view of a display according to an embodiment of the present invention.
Figure 4B:
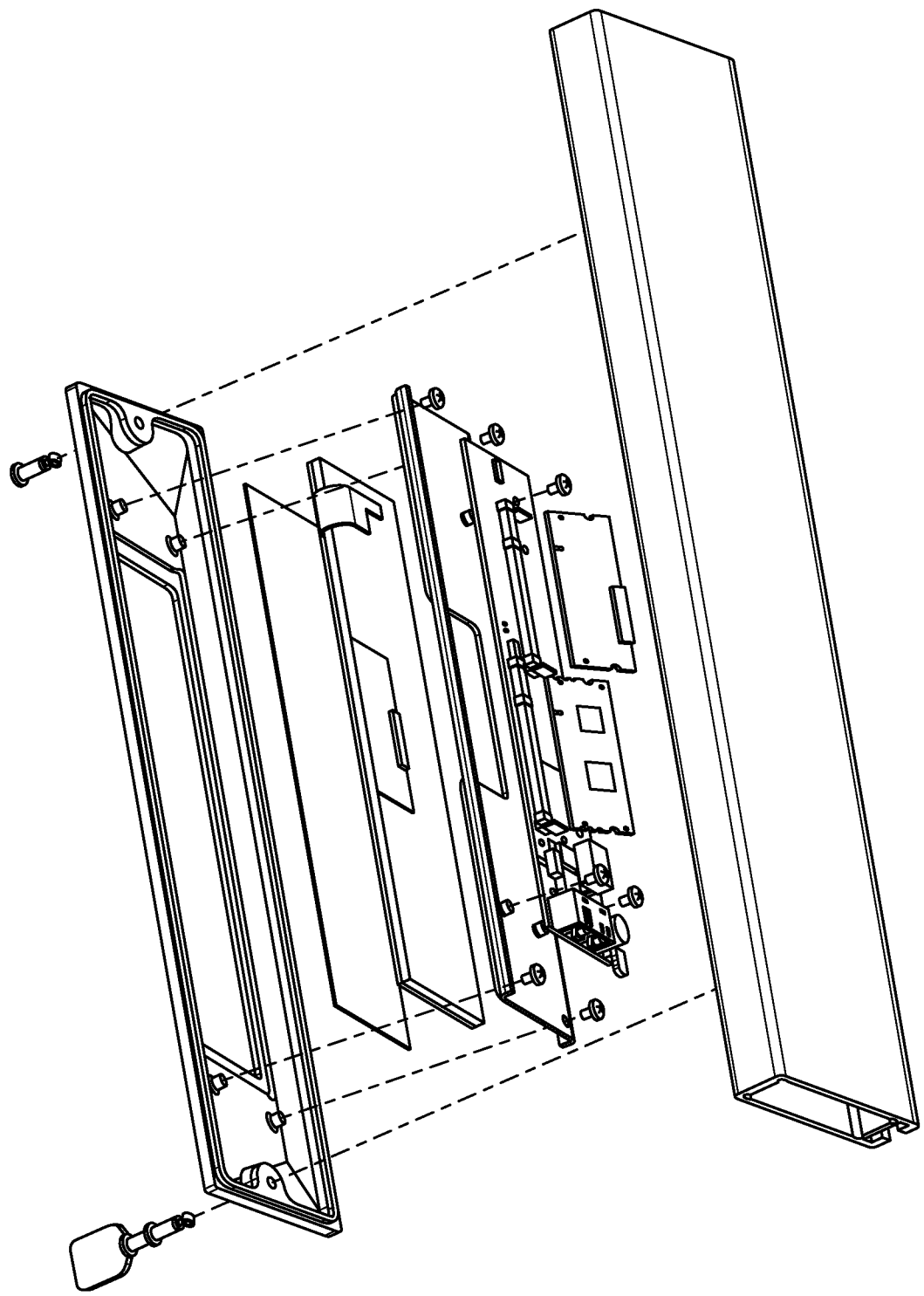
FIGS. 4B, and 4C respectively illustrate exploded and top and exploded side views of the display of FIG. 4A.
Figure 4C:
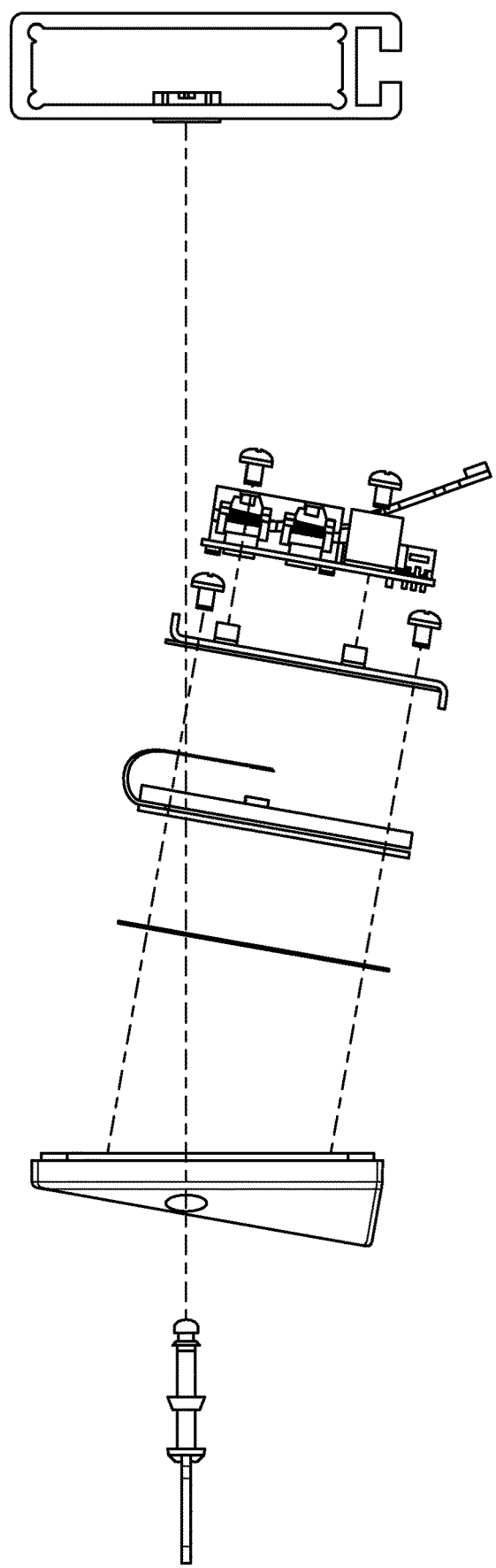
Figure 5A:
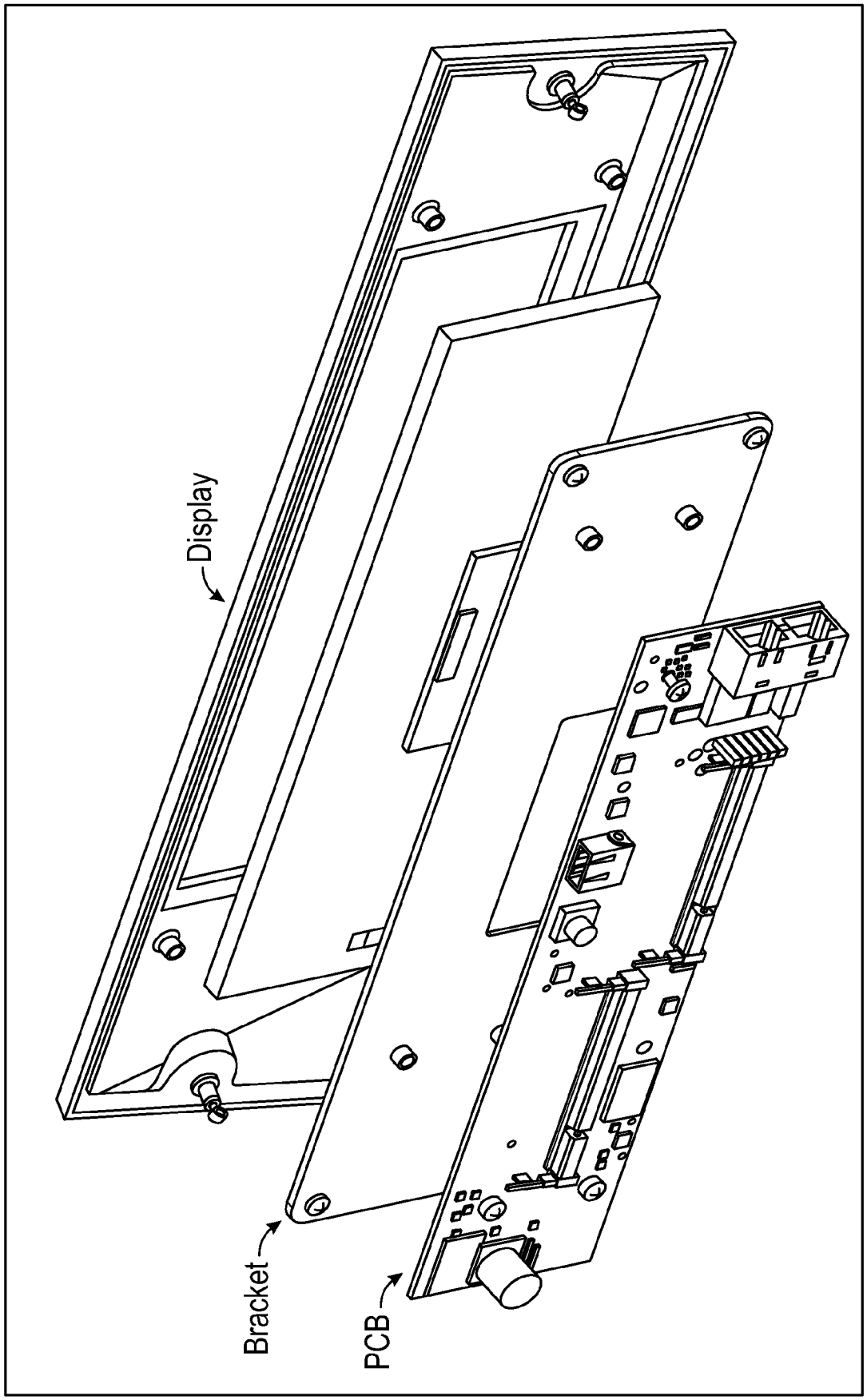
FIG. 5A is a drawing which illustrates a partially exploded view of a display, bracket and printed circuit board according to an embodiment of the present invention.
Figure 5B:
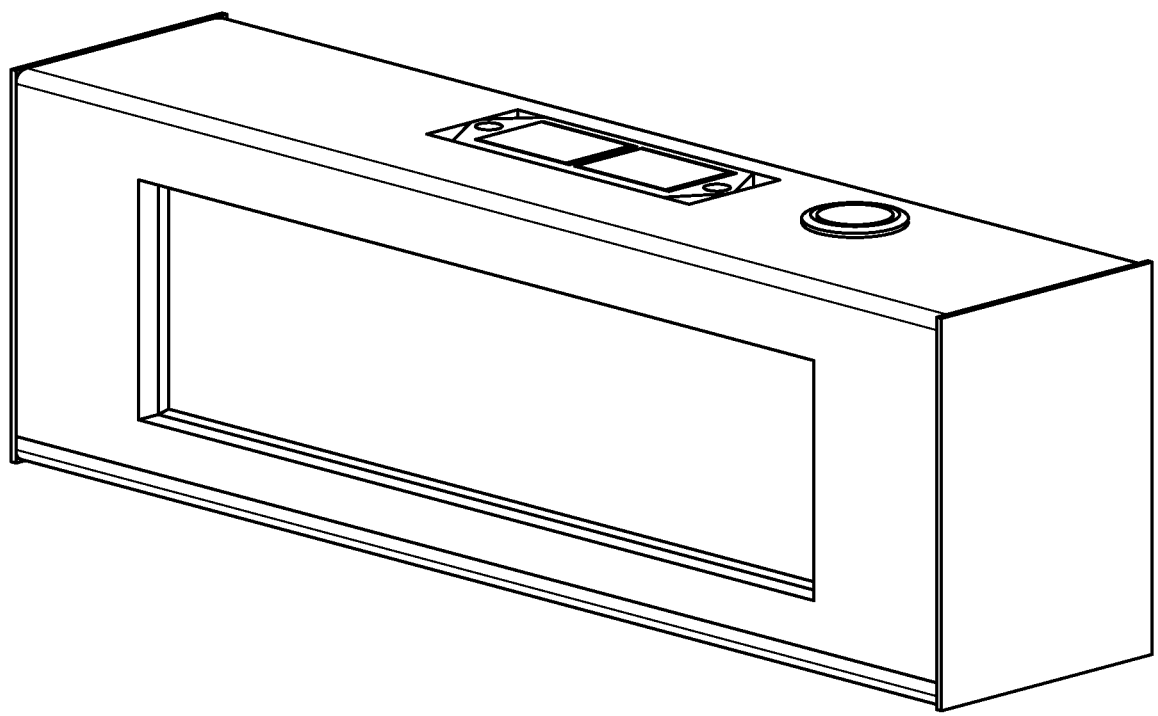
FIGS. 5B and 5C, respectively illustrate an elevated perspective view and a front view of a display according to an embodiment of the present invention.
Figure 5C:
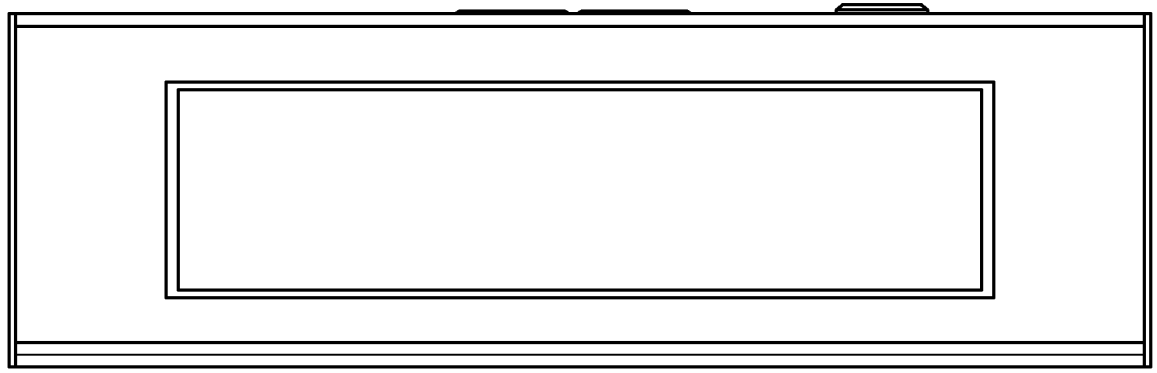
Figure 5D:
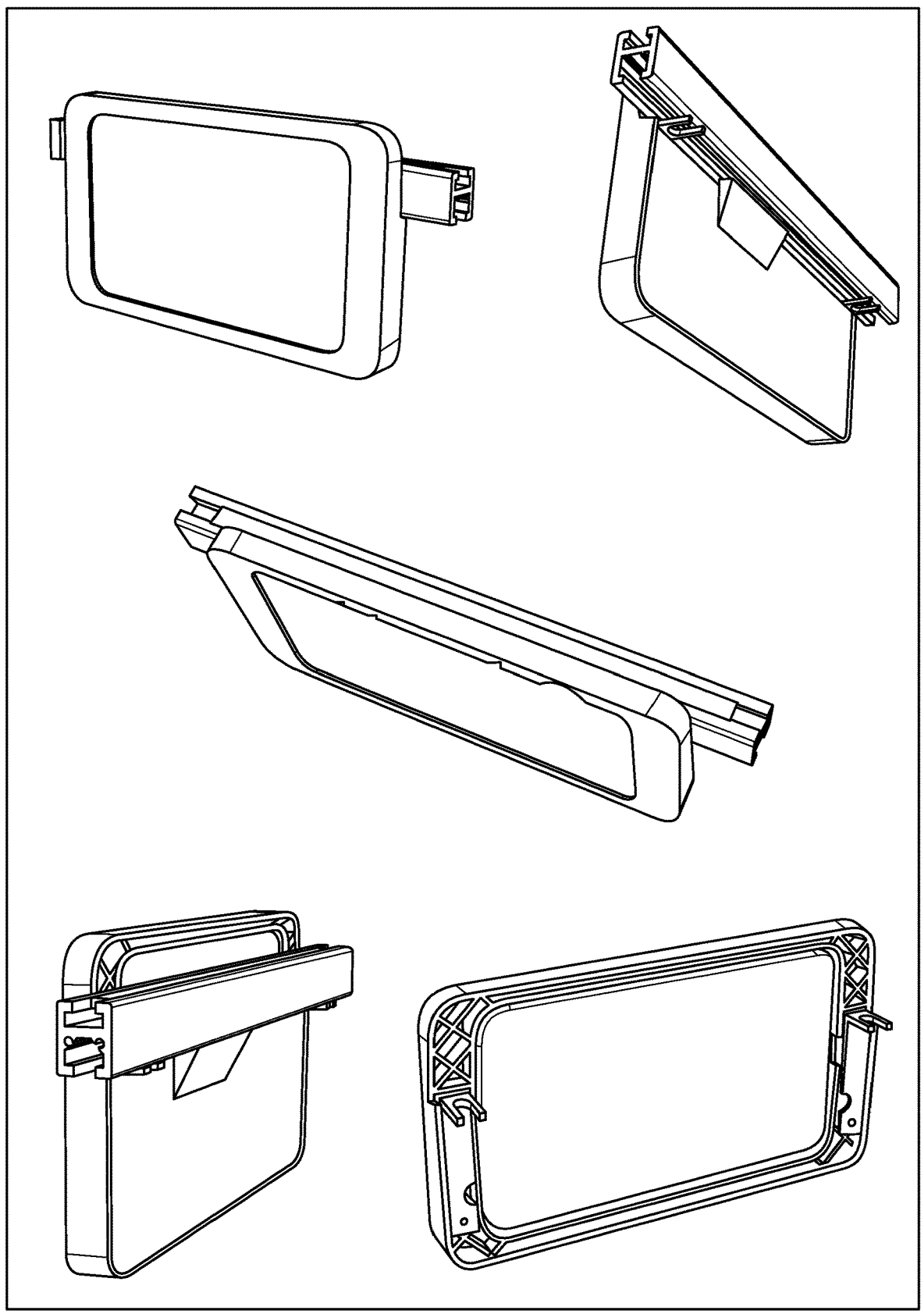
FIG. 5D are drawings which illustrates a display according to an embodiment of the present invention as observed from various perspectives.
Figure 5E:
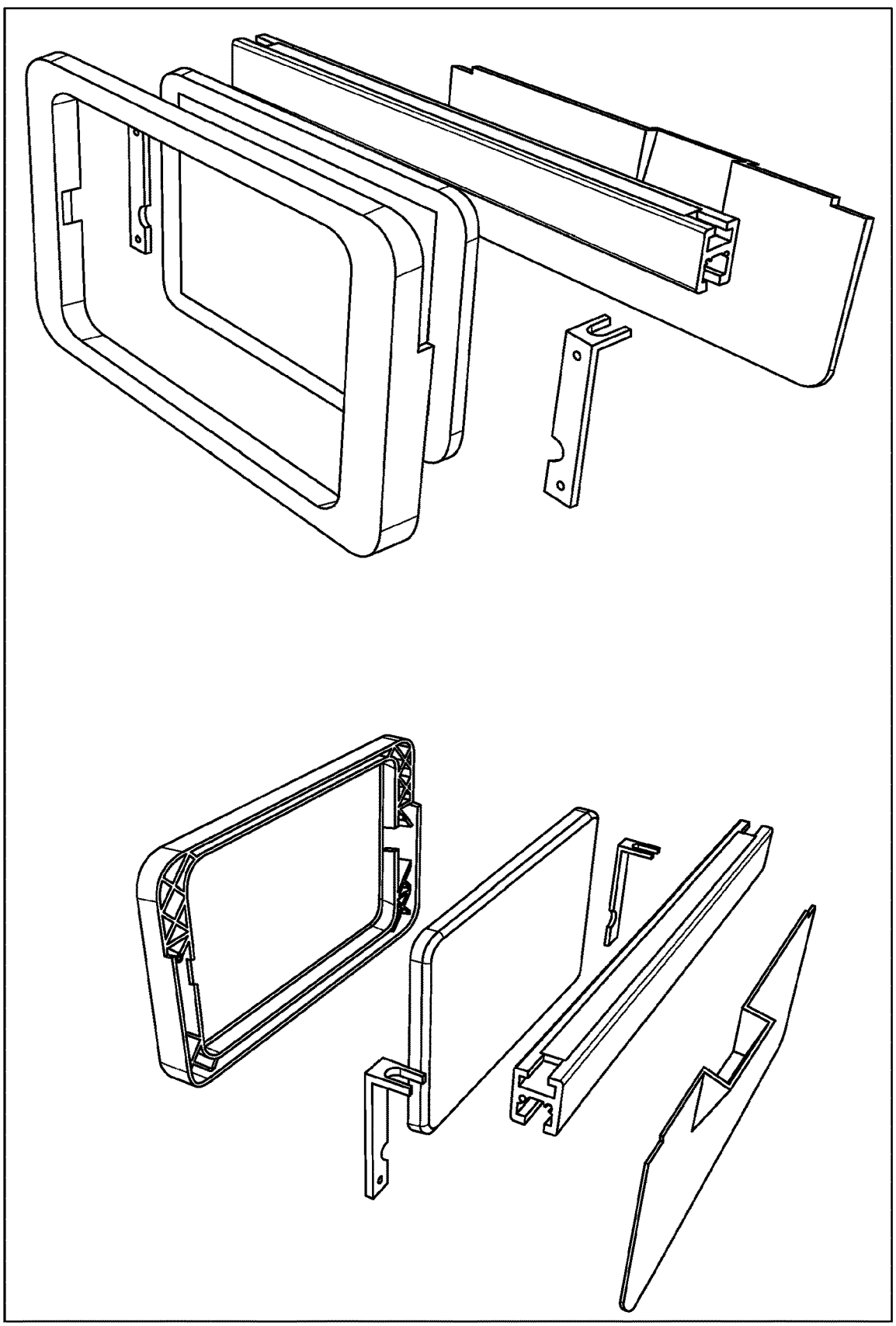
FIG. 5E are drawings which illustrate exploded views of a display according to an embodiment of the present invention.
Figure 6A:
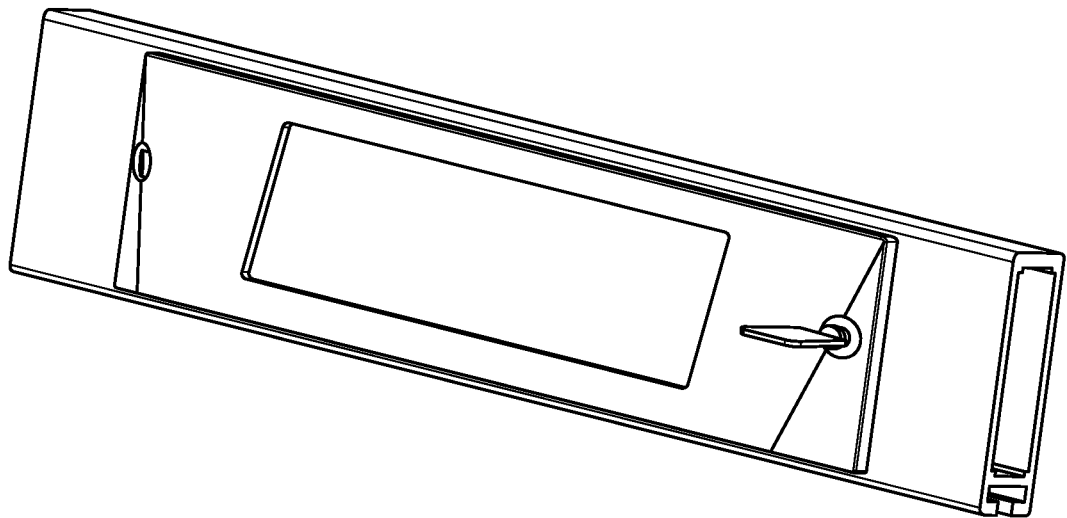
FIGS. 6A and 6B respectively illustrate perspective and front views of a display according to an embodiment of the present invention.
Figure 6B:
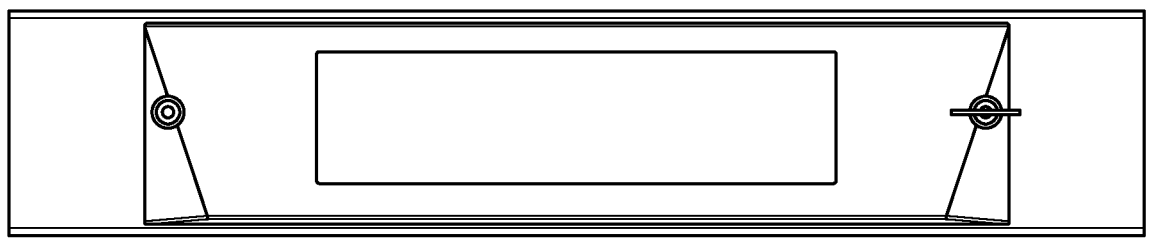

As best illustrated in FIGS. 3A and 3B to provide redundancy with the network, in one embodiment, an ethernet ring can be used. If a single display unit or some intervening connection fails, the packets will travel the other direction on the ring, thus providing the ability for a single unit to fail without shutting down the remainder of the rail. The downside of this configuration is a long run from the final unit back to the beginning. In one embodiment, CAT6 cable can be run between the modules using standard RJ45's. If everything is terminated with TIA-568A (or B, as it doesn't matter), this leaves 4 pairs pinned out as follows: 1,2 pair A; 3,6 pair B; 4,5 pair C; 7,8 pair D. Pairs AB are preferably used for data in a 10/100 circuit and CD are spare (or non-standard power over Ethernet implementations).

By swapping pairs AB and CD on the output of each module, standard equipment can be plugged into the "in" port and because it uses pairs AB it will function as expected. The "out" port would not function with standard ethernet equipment without a custom cable—but in normal operations it can be used with the carrier boards. This configuration removes any single long run (except for the run to the head end). While a downside is that removing a segment from the chain shuts down everything down stream, that should only happen during a removal and replacement of a display. This prevents a single broken unit in the chain from shutting any other units down. FIG. 3A illustrates a loopback that can be used at the end of a string of display units. As illustrated therein, ETH OUT pair is tied back to the spare pair, thus closing the loop. Pair 12 is preferably tied to pair 45, and pair 36 is preferably tied to pair 78.

As best illustrated in FIG. 3B, because embodiments of the present invention are particularly useful when used for live events, fail safes to prevent outages are particularly desirable. Because embodiments of the present invention can optionally provide a display at every seat location, network homeruns can be impractical or otherwise less than desirable. Therefore, in one embodiment, the audience/seating charts are preferably broken into segments of rows and zones.

Small groups of patron seating—for example rows of seats, are preferably linked via a daisy chained network, which itself is most preferably a closed loop of two twisted pairs, which themselves are preferably capable of supporting about 10 or 100 mega-bits per second (or more) on one larger network cable.

Each group configuration (or optionally some group configurations) preferably has a physical homerun to a zone distribution rack. The home run, which can be for example a Cat6 cable, is preferably logically split into two separate signal routes that alternate every other display (See FIG. 3B). At one end only, the routes are physically split as well and preferably close on two ports of a distribution network switch that are preferably programmed to use Rapid Spanning Tree Protocol to self-check data sent and received. This connection, through the network switch, preferably forms one end of the loop of communication connecting all units of the group configuration. The other end of the loop is preferably closed using a loop back termination plug (See FIG. 3A) that bridges two signal routes. One route primarily acts as a send path while the other primarily acts as a return. If the network switch detects that a certain loop is incomplete, i.e. data sent out does not arrive at the return port, this can indicate a breakpoint in the network. Both ports preferably then become broadcast ports until the loop is restored, thus "back-feeding" the network to the breakpoint via the return route to ensure that as many displays as possible continue to receive the data.

Diagnostic tools in the software can optionally run network tests to identify the break point in order to assist in identifying bad cable/hardware so that a technician can make repairs to the physical system.

Although zones can be arranged in any desirable configuration, in one embodiment, zones are preferably groups of rows that can be based on physical location of seating and wiring requirements. Each zone is preferably connected to the distribution network via a primary and secondary fiber link. In the event that the primary link fails, the secondary link preferably continues to carry communication for the system.

Although the foregoing discussion referenced examples of positions of data (for example "position 01") it is to be understood that the mentioning of specific positions is merely to provide a concise and exemplary explanation of an embodiment of the present invention. To be clear, any desired data position can be used for any of the foregoing discussion, so long as that data position is distinct from the other used data positions. Further, although the foregoing discussion referred to a "libretto" this too was done for simplicity and to provide an exemplary explanation of an embodiment of the present invention. In one embodiment, all necessary display instructions and the display data are packed into a single data packet. In one embodiment, display instructions for display data are not sent in a separate or different data packet. In one embodiment of the present invention, the display device of the present invention is not limited to a libretto display and can instead comprise a display for any other desired data display, entertainment, information, advertising and/or a combination thereof. In one embodiment, the displays are preferably touch screen displays and do not comprise a momentary switch to select a desired channel.

Optionally, embodiments of the present invention can include a general or specific purpose computer or distributed system programmed with computer software implementing steps described above, which computer software may be in any appropriate computer language, including but not limited to C++, FORTRAN, BASIC, Java, Python, Linux, assembly language, microcode, distributed programming languages, etc. The apparatus may also include a plurality of such computers distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements. One or more processors and/or microcontrollers can operate via instructions of the computer code and the software is preferably stored on one or more tangible non-transitive memory-storage devices.

Note that in the specification and claims, "about" or "approximately" means within twenty percent (20%) of the numerical amount cited. All computer software disclosed herein may be embodied on any non-transitory computer-readable medium (including combinations of mediums), including without limitation CD-ROMs, DVD-ROMs, hard drives (local or network storage device), USB keys, other removable drives, ROM, and firmware.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguring their relationships with one another.

What is claimed is:

1. A multi-channel data distribution method comprising:
    creating a master database file containing first display data for at least one of a plurality of displays and storing the master database file in an arbiter;
    displaying the first display data on the at least one of the plurality of displays and for any of the plurality of displays not having any display data contained in the master database file, displaying a default message; and
    forming at least one data packet by combining second display data for a plurality of channels, a signifier, and at least one display instruction packed together in a single data packet, wherein the second display data for the plurality of channels comprises second display data for a first language and second display data for a second language.

2. The multi-channel data distribution method of claim 1 further comprising sending the at least one data packet from the arbiter to one or more distribution servers which then send the at least one data packet to a plurality of displays.

3. The multi-channel data distribution method of claim 1 further comprising loading preselected display data into memory on a plurality of displays.

4. The multi-channel data distribution method of claim 3 wherein loading preselected display data into memory on the plurality of displays comprises sending the preselected display data from the arbiter.

5. The multi-channel data distribution method of claim 3 further comprising the plurality of displays displaying a non monochromatic image that was loaded as preselected display data into the plurality of displays.

6. The multi-channel data distribution method of claim 3 wherein loading preselected display data into memory on the plurality of displays comprises loading a preselected video for display into memory of the plurality of displays.

7. The multi-channel data distribution method of claim 6 further comprising the plurality of displays displaying the video that was loaded as preselected display data.

8. The multi-channel data distribution method of claim 1 wherein transmitting the at least one data packet further comprises transmitting the at least one data packet on a bi-directional communication channel.

9. The multi-channel data distribution method of claim 8 further comprising determining whether all connected displays have received the at least one data packet and if at least one display is determined not to have received the at least one data packet, retransmitting the at least one data packet on a line that is different from a line that the at least one data packet was originally transmitted on.

10. The multi-channel data distribution method of claim 9 wherein determining whether all connected displays have received the at least one data packet comprises transmitting the at least one data packet from a distribution network switch that is programmed for rapid spanning tree that can self check data sent and received.

11. The multi-channel data distribution method of claim 1 further comprising providing information in the at least one data packet directed to and received by some subset of a plurality of displays.

12. The multi-channel data distribution method of claim 1 wherein first display data comprises sponsor information.

13. The multi-channel data distribution method of claim 1 wherein transmitting the at least one data packet comprises transmitting the at least one data packet from an arbiter to a plurality of displays via a closed-loop daisy-chained network.

14. The multi-channel data distribution method of claim 1 further comprising transmitting the at least one data packet via a closed-loop daisy-chained network which is formed on a closed loop of two 10/100 twisted pairs on a network cable.

15. The multi-channel data distribution method of claim 1 further comprising transmitting the at least one data packet to a plurality of groups of displays.

16. The multi-channel data distribution method of claim 1 wherein forming at least one data packet comprises forming at least one data packet comprising data derived from a live entertainment event that is occurring in real-time.

* * * * *